Patented Jan. 14, 1947

2,414,155

UNITED STATES PATENT OFFICE 2,414,155

ANTHRAQUINONE DYESTUFFS

Frank Lodge, Blackley, Manchester, England, assignor to Imperial Chemical Industries Limited, a corporation of Great Britain No Drawing. Application May 17, 1944, Serial No. 536,023. In Great Britain May 18, 1943

2 Claims. (Cl. 260—276)

This invention relates to the manufacture of new anthraquinone dyestuffs and in particular it relates to the manufacture of new anthraquinone dyestuffs in the molecule of which an anthraquinone-2:1-(N)-acridone nucleus is united through an —NHYNH— bridge, wherein Y stands for —COAr— or —ArCO—, Ar being an arylene radical, to a 1-arylaminoanthraquinone carbazole nucleus.

According to the invention we manufacture new anthraquinone dyestuffs of the formula:

XNHYNHZ wherein X is an anthraquinone-2:1-(N)-acridone nucleus attached to the adjacent —NH-group in the 3-, 4-, 5-, 6-, 7- or 8-positions, Y is either —COAr— or —ArCO—, Ar being an arylene radical, and Z is a 1-arylaminoanthraquinone carbazole nucleus attached to the adjacent —NH— group in the 4-, 5-, or 8-positions, by a process which comprises either interacting a 3-, 4-, 5-, 6-, 7- or 8-halogeno-aroylaminoanthraquinone-2:1-(N)-acridone with a 4-, 5-, or 8-amino-1-arylaminoanthraquinone carbazole, or interacting a 3-, 4-, 5-, 6-, 7- or 8-aminoanthraquinone-2:1-(N)-acridone with a 4-, 5-, or 8-carboxyarylamino-1-arylaminoanthraquinone carbazole, or its amide-forming derivatives or with a 4-, 5-, or 8-halogenoaroylamino-1-arylaminoanthraquinone carbazole, or interacting a 3-, 4-, 5-, 6-, 7- or 8-carboxyarylaminoanthraquinone-2:1-(N)-acridone, or its amide-forming derivatives with a 4-, 5- or 8-amino-1-arylaminoanthraquinone carbazole.

The anthraquinone-2:1-(N)-acridone nucleus may be for example an anthraquinone-2:1-(N)-benzacridone nucleus or an anthraquinone-2:1-(N)-α- or -β-naphthacridone nucleus. Suitable aminoanthraquinone-2:1-(N)-acridones which may be used as starting materials include 3-aminoanthraquinone-2:1-(N)-benzacridone, 4-amino-anthraquinone-2:1-(N)-benzacridone, 4-aminoanthraquinone - 2:1 - (N)-p-methylbenzacridone, 5 - aminoanthraquinone - 2:1 - (N)-benzacridone and 8 - aminoanthraquinone - 2:1-(N) - benzacridone. Or again, as said, there may be used as starting materials halogenoaroylaminoanthraquinone-2:1-(N)-acridones. Suitable halogenoaroylaminoanthraquinone-2:1-(N)-acridones which may be used include 3-p-bromobenzoylaminoanthraquinone-2:1-(N) - benzacridone, 4-p-bromobenzoylaminoanthraquinone-2:1-(N)-benzacridone, 4-p-(p'-brimophenyl)-benzoylaminoanthraquinone-2:1-(N) - benzacridone, 4 - m - bromobenzoylaminoanthraquinone - 2:1-(N) - benzacridone, 4-o-chlorobenzoylaminoanthraquinone-2:1-(N)-benzacridone, 4-(3':5'-dichloro - 4' - bromobenzoylamino) anthraquinone-2:1-(N)-benzacridone, 5-o-chlorobenzoylaminoanthraquinone-2:1-(N)-benzacridone, 5-m-bromobenzoylaminoanthraquinone-2:1 - (N) - benzacridone, 4 - (p-bromo-α-naphthoylamino) - anthraquinone-2:1-(N)-benzacridone, and 5-p-bromobenzoylaminoanthraquinone - 2:1 - (N) - benzacridone. These substances may be made by acylation of the appropriate aminoanthraquinone-2:1-(N)-acridone with the appropriate halogenoaroyl halide.

As examples of carboxyarylaminoanthraquinone-2:1-(N)-acridones which may also be used as starting materials there may be mentioned 4 - p - carboxyanilinoanthraquinone - 2:1 - (N) - benzacridone and 5-m-carboxyanilinoanthraquinone-2:1-(N)-benzacridone. These substances may be made by condensation of the appropriate halogenoanthraquinone-2:1 - (N) - benzacridone with the appropriate carboxyarylamine.

The anthraquinone-2:1-(N)-acridone nucleus may carry, besides the —NHYNHZ group, also other groups, provided they are such as not to take part in the reaction or reactions whereby the —NHYNHZ group is generated and which are not detrimental to the value of the product as a vat dyestuff i. e. are not for example, changed in the vatting process. Suitable substituents are for example alkyl and alkoxyl groups.

By a 1-arylaminoanthraquinone carbazole we mean the carbazole resulting from the cyclisation of a 1-arylaminoanthraquinone. Amino-1-arylaminoanthraquinone carbazoles may be made as described for example, in Swiss Patent Specification No. 221,928. Suitable amino-1-arylaminoanthraquinone carbazoles for use as starting materials in the process of the invention include 4-amino-1-p-tolylaminoanthraquinone carbazole, 5-amino-1-β-naphthylaminoanthraquinone carbazole and 4-amino-1-β-naphthylaminoanthraquinone carbazole. Halogenoaroylamino - 1 - arylaminoanthraquinone carbazoles for use as starting materials may be made by acylation of the corresponding amino-1-arylaminoanthraquinone carbazole by means of the appropriate halogenoaroyl halide. Suitable halogenoaroylamino-1-arylaminoanthraquinone carbazoles include 4-p-bromobenzoylamino-1 - β - naphthylamino - anthraquinone carbazole, 4-m-bromobenzoylamino-1-β-naphthylaminoanthraquinone carbazole, 4-o-chlorobenzoylamino-1 - β - naphthylaminoanthraquinone carbazole, 4-p-(p'-bromophenyl)- benzoylamino - 1 - β - naphthylaminoanthraquinone carbazole, and 5-m-bromobenzoylamino-1-β-naphthylaminoanthraquinone carbazole.

Carboxyarylamino - 1 -arylaminoanthraquinone carbazoles for use in the process of the invention may be made by condensation of the appropriate halogeno-1-arylaminoanthraquinone carbazole with the appropriate carboxyarylamine. Suitable carboxyarylamino - 1 - arylaminoanthraquinone carbazoles which may be used include 4-p-carboxyanilino-1-β - naphthylaminoanthraquinone carbazole, 4-m-carboxyanilino-1-p-tolylaminoanthraquinone carbazole and 5-p-carboxyanilino-1-β-naphthylaminoanthraquinone carbazole.

Like the anthraquinone-2:1-(N)-acridone nucleus the 1-arylaminoanthraquinone carbazole nucleus (which may also be named a 1:2-phthaloylcarbazole nucleus) may carry substituents in addition to those taking part in the reactions whereby the XNHYNH-group is generated. These substituents may be in any position provided one of the 4, 5 or 8 (i. e. the α) positions of the anthraquinone nucleus is left free for the bridging group and they may be of any nature such as not to interfere in the bridging reaction or in the subsequent use of the product as a vat dyestuff. Again suitable substituents are the neutral groups, for example alkyl and alkoxyl groups.

The group Y, as said, may be —COAr— or —ArCO— and Ar stands for an arylene radical. Suitable arylene radicals are for example 1:2-, 1:3- and 1:4-phenylene, 4:4'-diphenylene and 1:4-naphthylene.

As suitable amide-forming derivatives of the 4-, 5-, or 8-carboxyarylamino-1-arylamino-anthraquinone carbazole or of the 3-, 4-, 5-, 6-, 7- or 8-carboxyarylaminoanthraquinone-2:1-(N)-acridone there may be mentioned the acid chlorides or bromides.

The process of the invention may be carried into effect by heating the chosen pair of reactants together, preferably in the presence of a solvent of high boiling point, for example nitrobenzene or naphthalene. In cases where one of the reactants is an acid chloride such heating together is sufficient to bring about the formation of the desired dyestuff in good yield. In other cases however it is advisable to carry out the interaction in the presence also of an acid binding agent, for example sodium carbonate; and also of a catalyst, preferably a copper salt, for example cuprous chloride.

The products of the invention are vat dyestuffs which dye textile materials in shades varying from reddish-brown to a bluish- or greenish-gray of very good fastness to light, to chlorine and to soda-boiling.

The invention is illustrated but not limited by the following examples in which parts are by weight:

Example 1

22.5 parts of 4-aminoanthraquinone-2:1-(N)-benzacridone, 36.4 parts of 4-p-bromobenzoylamino-1-β-naphthylaminoanthraquinone carbazole (obtained by condensing 4-chloro-1-p-bromobenzoylaminoanthraquinone with β-naphthylamine and cyclising the product in 90% sulphuric acid), 8 parts of anhydrous sodium carbonate, 2 parts of cuprous chloride and 750 parts of nitrobenzene are stirred and boiled under a reflux condenser for 12 hours. The product is cooled, diluted with 500 parts of ethanol, filtered and washed on the filter with ethanol. It is then boiled with dilute hydrochloric acid, refiltered, washed with water and dried. Dark brown crystals are obtained which give a greenish solution in concentrated sulphuric acid. Cotton is dyed from its dull red vat in greyish brown shades of very good fastness properties, especially to soda boiling and to light.

A similar greyish brown vat dyestuff is obtained from 4-m-bromobenzoylamino-1-β-naphthylaminoanthraquinone carbazole while 5-p-bromobenzoylamino- 1 -β-naphthylaminoanthraquinone carbazole yields a khaki dyestuff.

Example 2

52 parts of 4-p-bromobenzoylaminoanthraquinone-2:1-(N)-benzacridone, 33 parts of 4-amino-1 - p - tolylaminoanthraquinone carbazole (obtained by hydrolysing the corresponding benzoylamino compound with caustic potash in boiling β-ethoxyethanol), 12 parts of anhydrous sodium carbonate, 2 parts of cuprous chloride and 800 parts of nitrobenzene are stirred and boiled during 12 hours. The mixture is then diluted with nitrobenzene, filtered cold, washed with nitrobenzene, then with ethanol, and the dyestuff is finally boiled with dilute hydrochloric acid to remove copper, filtered, washed and dried. It is purified by extraction of impurities in boiling pyridine when a black powder remains which yields a dull brownish red vat and dyes cotton in greenish grey shades of very good fastness.

Example 3

24 parts of 5-o-chlorobenzoylaminoanthraquinone-2:1-(N)-benzacridone, 18 parts of 5-amino - 1-β-naphthylaminoanthraquinone carbazole, 6 parts of anhydrous sodium carbonate, 1 part of cuprous chloride and 600 parts of nitrobenzene are stirred and boiled for 12 hours. The mixture is then cooled, diluted with ethanol and filtered. The product is washed with ethanol, boiled with dilute hydrochloric acid, refiltered, washed with water and dried. It is purified by extraction of impurities with boiling pyridine when the dyestuff remains as dark brown crystals yielding an olive solution in concentrated sulphuric acid. It yields a violet coloured vat and dyes cotton in fast reddish brown shades.

Example 4

78 parts of 5-m-bromobenzoylaminoanthraquinone-2:1-(N)-benzacridone, 54 parts of 4-amino - 1-β-naphthylaminoanthraquinone carbazole, 18 parts of anhydrous sodium carbonate, 3 parts of cuprous chloride and 1750 parts of nitrobenzene are stirred and boiled for 12 hours. The product is isolated as in Examples 2 and 3 and is purified by extraction of impurities with hot pyridine. Dark violet brown crystals are obtained which yield a green colour in concentrated sulphuric acid and dye cotton in dull violet brown shades of good fastness properties.

In a similar manner 5-o-chlorobenzoylamino- and 5-p-bromo-benzoylamino - anthraquinone-2:1-(N)-benzacridones yield reddish brown and grey brown vat dyestuffs respectively.

Example 5

52 parts of 4-p-bromobenzoylaminoanthraquinone-2:1-(N)-benzacridone, 36 parts of 4-amino - 1-β-naphthylaminoanthraquinone carbazole (obtained by hydrolysing the corresponding benzoylamino derivative with caustic potash in hot β-ethoxyethanol), 12 parts of anhydrous sodium carbonate, 2 parts of cuprous chloride and 1200 parts of nitrobenzene are stirred and boiled gently during 12 hours. After cooling and diluting with ethanol the product is filtered, washed with ethanol, extracted with hot dilute hydrochloric acid to remove copper, refiltered, washed and dried. The dyestuff is purified by boiling with pyridine, and filtering at 50° C. to remove impurities. There is thus obtained as residue a blue-black, finely crystalline powder soluble in concentrated sulphuric acid to give a greenish coloured solution. Cotton is dyed from its dull reddish violet vat in very fast greenish grey shades.

Grey vat dyestuffs may also be obtained by substituting the 4-p-bromobenzoylaminoanthraquinone-2:1-(N)-benzacridone in the above examples by 4-m-bromobenzoylamino or by 4-o-chlorobenzoylaminoanthraquinone - 2:1 - (N) - benzacridone.

Example 6

60 parts of 4-p-(p'-bromophenyl)-benzoylaminoanthraquinone-2:1-(N) - benzacridone, 36 parts of 4-amino-1 - β - naphthylaminoanthraquinone carbazole, 12 parts of anhydrous sodium carbonate, 3 parts of cuprous chloride and 1000 parts of nitrobenzene are stirred and boiled for 15 hours. The mixture is then cooled and filtered. The product is washed with nitrobenzene, then with ethanol, boiled with dilute hydrochloric acid, filtered, washed with water and dried. It is purified by extraction with boiling pyridine when the dyestuff remains as a dark greenish grey powder, yielding a dull greyish green solution in concentrated sulphuric acid. From a red vat it dyes cotton in greenish grey shades.

Similarly a grey-green vat dye is obtained by using 58 parts of 4-(p-bromo - α - naphthoylamino) - anthraquinone-2:1-(N) - benzacridone (obtained by acylating 4-aminoanthraquinone-2:1-(N)-benzacridone with 4-bromo-1-naphthoyl chloride).

Example 7

34 parts of 4-aminoanthraquinone-2:1-(N)-benzacridone, 62 parts of 4-p-(p'-bromophenyl)-benzoylamino - 1 - β - naphthylaminoanthraquinone carbazole, 12 parts of anhydrous sodium carbonate, 3 parts of cuprous chloride and 1000 parts of nitrobenzene are stirred and boiled during 15 hours. The product is isolated and purified as is that described in Example 6 and a dark brown crystalline powder is obtained which yields a green solution in concentrated sulphuric acid, a red vat and dyes cotton dark brown shades.

Example 8

35.5 parts of 4-aminoanthraquinone-2:1-(N)-p-methylbenzacridone, 54.5 parts of 4-p-bromobenzoylamino-1-β- naphthylaminoanthraquinone carbazole, 15 parts of anhydrous sodium carbonate, 1.5 parts of cuprous chloride and 1000 parts of naphthalene are stirred at 210–15° for 18 hours. After cooling, the product is diluted with solvent naphtha and filtered at 90° C. washed with ethanol, extracted with hot dilute hydrochloric acid, refiltered, washed and dried. The product is purified by boiling with pyridine. There is thus obtained a black crystalline powder soluble to give a green solution in concentrated sulphuric acid. It yields a red vat and dyes cotton in dark brown shades very similar to the product described in Example 1.

Example 9

34 parts of 3-aminoanthraquinone-2:1-(N)-benzacridone, 55 parts of 4-p-bromobenzoylamino-1-β-naphthylaminoanthriquinone carbazole, 12 parts of anhydrous sodium carbonate, 2 parts of cuprous chloride and 1000 parts of nitrobenzene are stirred and boiled for 18 hours. The product is cooled, filtered, washed with ethanol and dried. It is then boiled with dilute hydrochloric acid, refiltered, washed with water and dried. The dyestuff is purified by extraction with boiling pyridine and crystallising the residue from nitrobenzene when a red brown crystalline powder is obtained. It yields a green colour in concentrated sulphuric acid and dyes cotton from a brownish red vat in corinth shades.

Example 10

12 parts of the acid chloride of 4-p-carboxyanilinoanthraquinone - 2:1 - (N) - benzacridone (prepared by condensation of the corresponding 4-aminoacridone with p-bromomethylbenzoate followed by hydrolysis of the product with caustic potash in boiling β-ethoxyethanol solution and treating the so-obtained 4-p-carboxyanilinoanthraquinone-2:1-(N)-benzacridone with a solution of thionyl chloride in nitrobenzene) are boiled in 200 parts of nitrobenzene with 9 parts of 4-amino-1- β -naphthylaminoanthraquinone carbazole. After cooling, the product is filtered off, washed on the filter with hot nitrobenzene then ethanol and dried. The product is identical with the dyestuff described in Example 1.

Example 11

20 parts of the acid chloride of 4-p-carboxyanilino-1-β-naphthylaminoanthraquinone carbazole (prepared by treating the reaction product from 4-amino-1-β-naphthylaminoanthraquinone carbazole and p-bromobenzoic acid with thionyl chloride in nitrobenzene solution) and 13 parts of 4-aminoanthraquinone-2:1-(N)-benzacridone are boiled in 400 parts of nitrobenzene. After cooling, the product is filtered off, washed with ethanol and dried. Recrystallisation from nitrobenzene gives a dyestuff identical with the product described in Example 5.

Example 12

53 parts of 3-p-bromobenzoylaminoanthraquinone-2:1-(N)-benzacridone, 36 parts of 4-amino - 1 - β -naphthylaminoanthraquinone carbazole, 12 parts of anhydrous sodium carbonate, 2 parts of cuprous chloride and 1000 parts of nitrobenzene are stirred together and boiled for 12 hours. The mixture is then cooled and filtered. The product on the filter is washed with ethanol, boiled with dilute hydrochloric acid, refiltered, washed with water and dried. It is purified by extraction with boiling pyridine when the dyestuff remains as a dark brown crystalline powder which yields a greyish green solution in concentrated sulphuric acid. From a dull brown violet vat it dyes cotton in corinth shades.

Example 13

26 parts of 4-p-bromobenzoylaminoanthraquinone-2:1-(N)-benzacridone, 18 parts of 5-amino-1 - β - naphthylaminoanthraquinone carbazole, 6 parts of anhydrous sodium carbonate, 1 part of cuprous chloride and 500 parts of nitrobenzene are stirred and boiled for 12 hours. The mixture is then cooled, diluted with ethanol and filtered. The product is washed with ethanol, boiled with dilute hydrochloric acid, refiltered, washed with water and dried. It yields a reddish vat and dyes cotton in dull corinth shades.

Similarly a dull corinth dyestuff is obtained by using 26 parts of 4-m-bromobenzoylaminoanthraquinone-2:1-(N)-benzacridone in the above example in place of the 4-p-bromobenzoylaminoanthraquinone-2:1-(N)-benzacridone.

*Example 14*

59 parts of 4-(3':5'-dichloro-4'-bromobenzoylamino)anthraquinone-2:1-(N)-benzacridone, 36 parts of 4-amino-1-β-naphthylaminoanthraquinone carbazole, 12 parts of anhydrous sodium carbonate, 2 parts of cuprous chloride and 1200 parts of nitrobenzene are stirred and boiled for 12 hours. The nitrobenzene is removed by distilling in steam and the product is boiled with dilute hydrochloric acid, filtered, washed and dried. The product dyes cotton in bluish grey shades from a reddish vat.

I claim:

1. The anthraquinone vat dyes which contain the nucleus

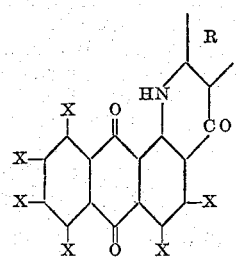

linked in one of the positions X through a radical of the group consisting of —NH—CO—Ar—NH— and —NH—Ar—CO—NH— to one of the positions Y in the nucleus

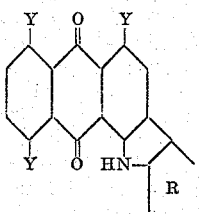

wherein R in each case stands for a nucleus of the benzene and naphthalene series and Ar is an arylene radical of the group consisting of 1:2-, 1:3- and 1:4-phenylene, 4:4'-diphenylene and 1:4-naphthylene, and in which the remaining X's and Y's in the respective nuclei stand for hydrogen, which dye textile fibers in shades varying from reddish-brown to blue- and greenish-gray of very good fastness to light, to chlorine and to soda ash boiling.

2. The anthraquinone vat dye of the following formula

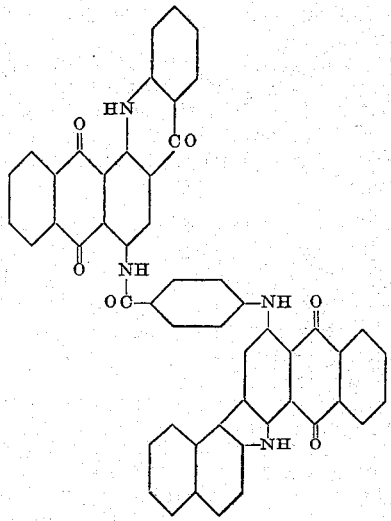

which dyes cotton from a dull reddish-violet alkaline hydrosulfite vat in very fast greenish-gray shades.

FRANK LODGE.